(12) United States Patent
Nakano

(10) Patent No.: US 10,267,285 B2
(45) Date of Patent: Apr. 23, 2019

(54) ROTATION DRIVE APPARATUS

(71) Applicants: YUGEN KAISHA NAKANOSEISAKUSHO, Tokyo (JP); NS CREATION LTD., Yokohama-shi, Kanagawa (JP)

(72) Inventor: Kazuaki Nakano, Yokohama (JP)

(73) Assignees: YUGEN KAISHA NAKANOSEISAKUSHO, Tokyo (JP); NS CREATION LTD., Yokohama-Shi, Kanagawa (JP)

( * ) Notice: Subject to any disclaimer, the term of this patent is extended or adjusted under 35 U.S.C. 154(b) by 847 days.

(21) Appl. No.: 14/368,222

(22) PCT Filed: Mar. 5, 2013

(86) PCT No.: PCT/JP2013/055921
§ 371 (c)(1),
(2) Date: Jun. 23, 2014

(87) PCT Pub. No.: WO2014/136198
PCT Pub. Date: Sep. 12, 2014

(65) Prior Publication Data
US 2015/0292468 A1    Oct. 15, 2015

(51) Int. Cl.
*F03B 5/00* (2006.01)
*F04D 5/00* (2006.01)
(Continued)

(52) U.S. Cl.
CPC ............... *F03B 5/00* (2013.01); *F03C 2/30* (2013.01); *F04C 15/0042* (2013.01);
(Continued)

(58) Field of Classification Search
CPC .. F03B 5/00; F03B 11/063; F03C 2/30; F04C 15/0042; F04C 15/0061; F04C 15/0065;
(Continued)

(56) References Cited

U.S. PATENT DOCUMENTS 2,436,246 A * 2/1948 Braga .................. F01D 5/08
415/75
3,198,191 A * 8/1965 Wyszomirski ............ F22B 3/06
126/247
(Continued)

FOREIGN PATENT DOCUMENTS

EP    1 015 760 A1    7/2000
EP    1 082 538 A1    3/2001
(Continued)

OTHER PUBLICATIONS

Extended European Search Report issued in corresponding EP Application No. 13869852.7 dated Jun. 22, 2016. (in English).

*Primary Examiner* — Nihn H. Nguyen
*Assistant Examiner* — Wayne A Lambert
(74) *Attorney, Agent, or Firm* — Birch, Stewart, Kolasch & Birch, LLP

(57) ABSTRACT

A rotary drive apparatus includes a housing having a housing hole defined therein, a cylindrical rotor being disposed in the housing hole, a working fluid passage through which a working fluid for applying a fluid pressure to one end face of the rotor flows, a motion limiting unit configured to limit motion of the rotor toward another end thereof, and an output shaft configured to extract rotary power of the rotor out of the rotary drive apparatus. A predetermined gap for the working fluid to flow therethrough is created between an outer circumferential surface of the rotor and a wall surface defining the housing hole.

8 Claims, 15 Drawing Sheets

(51) Int. Cl.
*F03C 2/30* (2006.01)
*F04C 15/00* (2006.01)

(52) U.S. Cl.
CPC .......... *F04C 15/0061* (2013.01); *F04D 5/001* (2013.01); *F04C 2240/60* (2013.01); *Y02E 10/20* (2013.01)

(58) Field of Classification Search
CPC ............. F04C 15/0069; F04C 15/0073; F04C 15/0057; F04C 2240/60; F04C 2240/601; F04D 5/00; F04D 5/001; F04D 5/007; F04D 5/008; Y02E 10/20; F01C 21/102
USPC .......................................................... 415/90
See application file for complete search history.

(56) References Cited

U.S. PATENT DOCUMENTS

| | | | | | |
|---|---|---|---|---|---|
| 3,476,449 | A | * | 11/1969 | Chaboseau | F16C 17/06 310/90.5 |
| 3,794,447 | A | * | 2/1974 | Bullough | H02K 7/14 310/60 R |
| 3,794,449 | A | * | 2/1974 | Brouwer | F04D 5/001 415/90 |
| 3,801,214 | A | * | 4/1974 | Jonsson | F04D 23/00 192/85.02 |
| 3,861,831 | A | * | 1/1975 | Rule | F04D 9/001 417/423.14 |
| 4,008,774 | A | * | 2/1977 | Milano | B23Q 5/06 173/153 |
| 4,153,993 | A | * | 5/1979 | Kataoka | A61C 1/05 310/90.5 |
| 4,320,927 | A | * | 3/1982 | Sertich | A61C 1/05 310/90.5 |
| 4,332,428 | A | * | 6/1982 | Maruyama | F16C 17/026 310/90.5 |
| 4,378,195 | A | * | 3/1983 | Gamell | F01D 1/36 415/202 |
| 4,483,277 | A | * | 11/1984 | Perkins | F22B 3/06 122/26 |
| 4,609,332 | A | * | 9/1986 | Miki | F04D 19/048 310/90.5 |
| 4,629,395 | A | * | 12/1986 | Mohsin | F01D 1/36 415/75 |
| 4,634,057 | A | * | 1/1987 | Coffee | B05B 5/16 239/302 |
| 4,836,758 | A | * | 6/1989 | Elson | F01C 1/0215 384/271 |
| 5,135,374 | A | * | 8/1992 | Yoshimura | F04C 29/0021 418/201.2 |
| 5,188,090 | A | * | 2/1993 | Griggs | F24J 3/003 122/26 |
| 5,733,120 | A | * | 3/1998 | Yao | A61C 1/05 433/132 |
| 6,139,267 | A | * | 10/2000 | Sedlacek | F03B 3/12 415/219.1 |
| 6,595,759 | B2 | * | 7/2003 | Crosta | F04D 5/001 126/247 |
| 6,702,038 | B1 | | 3/2004 | Sedlacek et al. | |
| 6,896,718 | B2 | * | 5/2005 | Hallman | B01D 53/263 95/156 |
| 7,531,934 | B2 | * | 5/2009 | Hang | B22D 19/0054 310/156.56 |
| 7,762,762 | B2 | * | 7/2010 | Simera | F03B 5/00 415/70 |
| 2004/0061394 | A1 | * | 4/2004 | Gotoh | F16C 17/026 310/90 |
| 2009/0246048 | A1 | * | 10/2009 | Kawasaki | F04D 17/168 417/423.4 |

FOREIGN PATENT DOCUMENTS

| | | |
|---|---|---|
| JP | 60-204978 A | 10/1985 |
| JP | 9-303273 A | 11/1997 |
| JP | 4124274 B2 | 7/2000 |
| JP | 2010-265797 A | 11/2010 |
| WO | WO 2005/071256 A1 | 8/2005 |
| WO | WO 2005/106205 A1 | 11/2005 |

\* cited by examiner

10A

10A

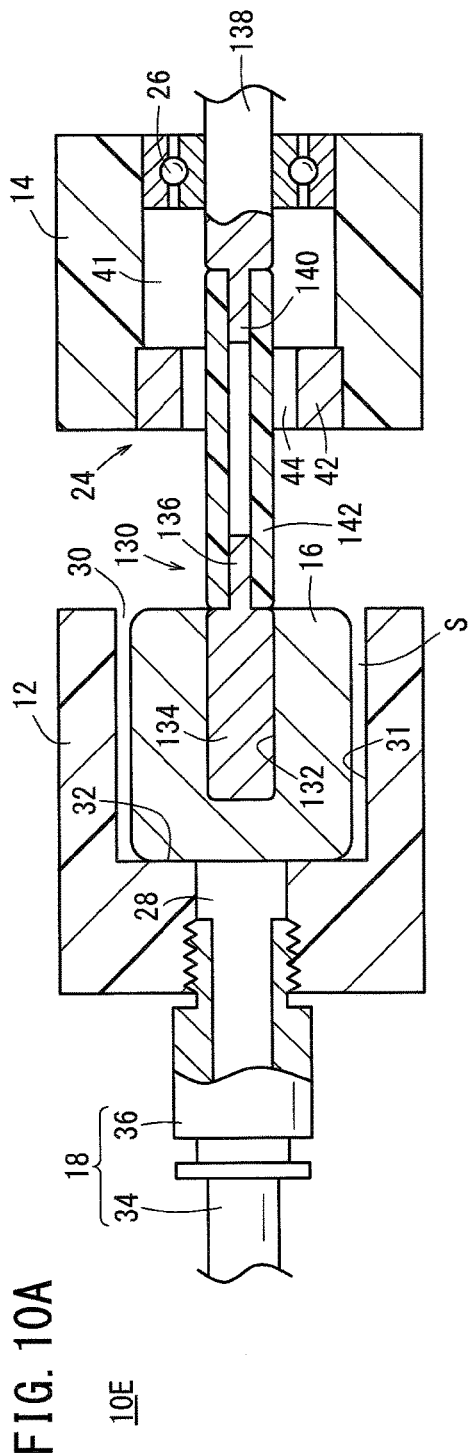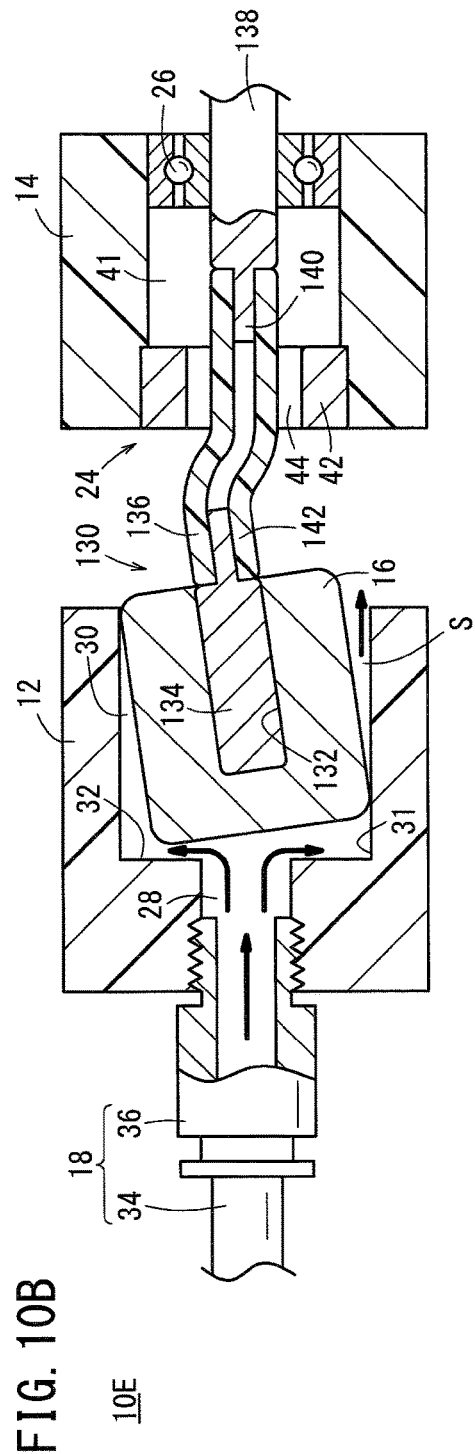

ROTATION DRIVE APPARATUS

TECHNICAL FIELD

The present invention relates to a rotary drive apparatus for rotating a cylindrical rotor by applying a fluid pressure to the cylindrical rotor.

BACKGROUND ART

Heretofore, a rotary drive apparatus such as a motor or the like for converting the pressure of a fluid into rotary motion has widely been used. Known motors of this type include a vane motor, a gear motor, and a piston motor, etc. (see, for example, Japanese Laid-Open Patent Publication No. 09-303273, Japanese Laid-Open Patent Publication No. 2010-265797, and Japanese Laid-Open Patent Publication No. 60-204978).

SUMMARY OF INVENTION

The conventional motors described above are problematic in that they tend to be complex in structure and large in size, and hence their manufacturing cost is high.

The inventors of the present application have found as a result of the intensive study conducted by them that if a cylindrical rotor is disposed in the housing hole in a housing and a predetermined gap is present between a wall surface that defines the housing hole and an outer circumferential surface of the rotor, then when the pressure of a fluid is applied to one end face of the rotor and the fluid flows through the gap, the rotor is caused to rotate.

The present invention has been made in view of the result of the study. It is an object of the present invention to provide a rotary drive apparatus which can be simplified and small in size and can be manufactured at a reduced cost.

According to the present invention, there is provided a rotary drive apparatus comprising a cylindrical rotor, a housing having a housing hole defined therein, the rotor being disposed in the housing hole, a working fluid passage through which a working fluid for applying a fluid pressure to one end face of the rotor flows, a motion limiting unit configured to limit motion of the rotor toward another end thereof, and an output shaft configured to extract rotary power of the rotor out of the rotary drive apparatus, wherein a predetermined gap for the working fluid to flow therethrough is created between an outer circumferential surface of the rotor and a wall surface defining the housing hole.

With the rotary drive apparatus according to the present invention, while the predetermined gap is being created between the outer circumferential surface of the cylindrical rotor disposed in the housing hole and the inner circumferential surface that defines the housing hole, the fluid pressure is applied to the one end face of the rotor, and the working fluid flows through the gap. Consequently, the rotor is rotated and the rotary power of the rotor is extracted from the output shaft. The rotary drive apparatus can be simplified and small in size and can be manufactured at a reduced cost. As the rotary drive apparatus has the motion limiting unit for limiting motion of the rotor toward the other end, when the fluid pressure is applied to the one end face of the rotor to move the rotor toward the other end, the rotor is prevented from being fully dislodged out of the housing hole.

In the above rotary drive apparatus, the rotor may be made of a magnet, and the housing may be made of a nonmagnetic material.

With the above arrangement, since the rotor is made of a magnet, and the housing is made of a nonmagnetic material, the rotor can be rotated efficiently.

In the above rotary drive apparatus, the rotor may be made of a neodymium magnet, and the housing may be made of polyacetal.

With the above arrangement, since the rotor is made of a neodymium magnet, and the housing is made of polyacetal, the rotor can reliably be rotated at a working fluid pressure (relatively low working pressure) under which the rotor cannot be rotated if the rotor is made of aluminum or the like.

In the above rotary drive apparatus, the motion limiting unit may have a fixed magnet configured to repel the rotor in facing relation to another end face of the rotor.

With the above arrangement, motion of the rotor toward the other end is limited in a contactless fashion under the repulsive force of the fixed magnet. In other words, inasmuch as there is no contact resistance (friction) is developed between the rotor and the fixed magnet, the rotary power of the rotor is prevented from being reduced by limiting motion of the rotor.

In the above rotary drive apparatus, the fixed magnet may be of a ring shape.

With the above arrangement, as the output shaft may extend through an inner hole defined in the fixed magnet, for example. The rotary drive apparatus can thus be reduced in size.

In the above rotary drive apparatus, the rotor may be disposed in the housing hole and have the other end projecting out of the housing hole, and the motion limiting unit may have a pressure bearing member extending radially outwardly from the other end of the rotor, and a fluid passage for a fluid to flow therethrough for pressing the pressure bearing member toward the one end of the rotor.

With the above arrangement, as the pressure bearing member on the other end of the rotor is pressed toward the one end of the rotor by the fluid introduced from the inlet fluid passage, the rotor is reliably limited against motion toward the other end thereof. Since the pressure bearing member extends radially outwardly of the rotor, the fluid introduced from the fluid passage is prevented from flowing into the housing hole, and the pressure-bearing area of the pressure bearing member for being contacted by the fluid is made relatively large.

The above rotary drive apparatus may further comprise a stopper configured to limit motion of the rotor toward one end thereof.

With the above arrangement, since motion of the rotor toward the one end which is caused by the motion limiting unit is limited by the stopper, the position of the rotor is kept substantially constant with respect to the housing hole while the rotor is held at rest (when the working fluid is not flowing in the working fluid passage). Consequently, the rotational characteristics of the rotor are prevented from varying each time the rotary drive apparatus is activated.

The above rotary drive apparatus may further comprise a power transmitting unit configured to transmit rotary power of the rotor to the output shaft.

With the above arrangement, since the rotary drive apparatus has the power transmitting unit even though the rotor and the output shaft are separate from each other, the rotary power of the rotor can reliably be transmitted to the output shaft.

BRIEF DESCRIPTION OF DRAWINGS

FIG. 10A is a longitudinal cross-sectional view, partly omitted from illustration, of a rotary drive apparatus according to a fifth embodiment of the present invention;

FIG. 10B is a longitudinal cross-sectional view, partly omitted from illustration, showing the manner in which the rotary drive apparatus starts to operate;

DESCRIPTION OF EMBODIMENTS

Rotary drive apparatuses according to preferred embodiments of the present invention will be described below with reference to the accompanying drawings.

First Embodiment

Figure 1A:
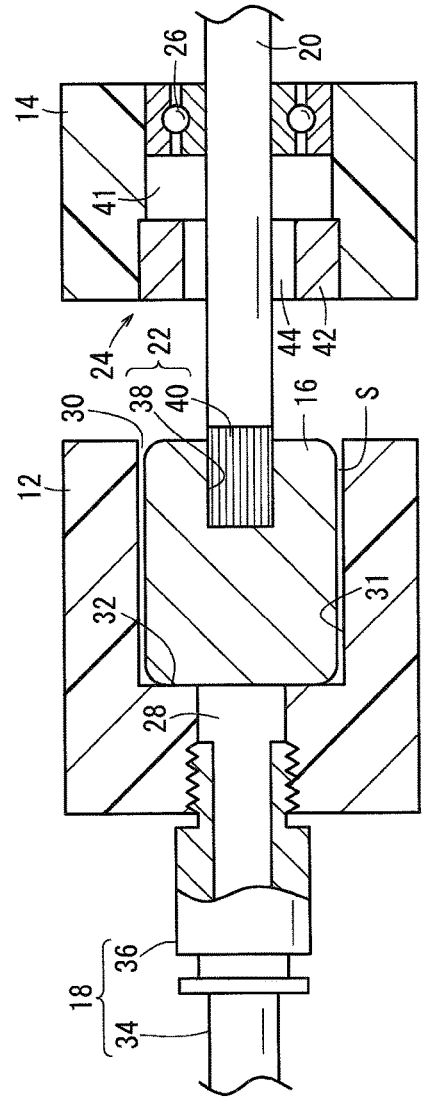
FIG. 1A is a longitudinal cross-sectional view, partly omitted from illustration, of a rotary drive apparatus according to a first embodiment of the present invention.

As shown in FIG. 1A, a rotary drive apparatus 10A according to the present embodiment includes a first housing 12 and a second housing 14 each having a tubular shape (a hollow cylindrical shape according to the present embodiment), a cylindrical rotor 16 disposed in the first housing 12, a fluid supply assembly 18 for supplying a working fluid for applying a fluid pressure to one end face of the rotor 16, a power transmitter (power transmitting unit) 22 for transmitting rotary power of the rotor 16 to an output shaft 20, a motion limiter (motion limiting unit) 24 disposed in the second housing 14 for limiting motion of the rotor 16 toward the other end, and a bearing 26 disposed in the second housing 14 and rotatably supporting the output shaft 20.

The first housing 12 is made of a nonmagnetic material, e.g., a polymeric material. The polymeric material may be polyurethane, polyacetal, MC nylon, PTFE (Teflon: registered trademark), or the like, for example.

The first housing 12 has a working fluid passage 28 defined in one end portion thereof and a housing hole 30 defined in another end portion thereof and held in fluid communication with the working fluid passage 28. The working fluid passage 28 serves as a fluid passage through which the working fluid flows for applying the fluid pressure to one end face of the rotor 16.

The rotor 16 is disposed in the housing hole 30. The diameter of the housing hole 30 is slightly greater than the outside diameter of the rotor 16. Therefore, when the rotor 16 is disposed in the housing hole 30, a predetermined gap (clearance) S is defined between a wall surface (inner circumferential surface) 31 that defines the housing hole 30 and an outer circumferential surface of the rotor 16. The gap S should preferably have a size (the dimension calculated by subtracting the diameter of the rotor 16 from the diameter of the housing hole 30) in the range from several μm to several hundred μm. If the size of the gap S falls outside of the above range, then the rotor 16 cannot be rotated efficiently.

The diameter of the housing hole 30 is set to a value greater than the diameter of the working fluid passage 28. As a result, a step is created in the boundary between the working fluid passage 28 and the housing hole 30. Of the step, a wall surface which faces the other end of the first housing 12 serves as a stopper 32 for being contacted by the one end face of the rotor 16.

The rotor 16 is made of a neodymium magnet. However, the rotor 16 may be made of any of various magnets other than a neodymium magnet, e.g., a samarium-cobalt magnet or the like. The entire length of the rotor 16 is substantially the same as the depth of the housing hole 30.

The fluid supply assembly 18 has an inlet fluid passage 34 for introducing the working fluid from a fluid supply source, not shown, and a joint 36 coupling the inlet fluid passage 34 to the first housing 12. The joint 36 is threaded into one open end of the working fluid passage 28. The inlet fluid passage 34 and the working fluid passage 28 are held in fluid communication with each other through the joint 36.

The working fluid according to the present embodiment comprises any of various fluids including air, water, and oil, etc. The working fluid may be a fluid compressed by a pump, a compressor, or the like (compressed fluid), or may be a fluid that falls freely from a source disposed vertically above the working fluid passage 28. In other words, the working fluid may be any fluid insofar as it can apply a predetermined fluid pressure to the one end face of the rotor 16.

The rotor 16 and the output shaft 20 are disposed coaxially with each other. The power transmitter 22 has a splined hole 38 defined in the other end face of the rotor 16 and a splined end portion 40 of the output shaft 20 at one end thereof which is fitted in the splined hole 38. The power transmitter 22 thus constructed is able to reliably transmit rotary power of the rotor 16 to the output shaft 20.

The second housing 14 may be made of any desired materials. For example, the second housing 14 is made of the same material as the first housing 12. The second housing 14 has an inner hole 41 defined therein which has substantially the same diameter as the housing hole 30. As shown in FIG. 1A, the second housing 14 is disposed such that the inner hole 41 thereof is spaced a predetermined distance from the housing hole 30 in the first housing 12 in facing relation thereto.

The motion limiter 24 has a fixed magnet 42 press-fitted or otherwise secured in one end of the inner hole 41 in the second housing 14 so as to repel the rotor 16. The fixed magnet 42 faces the rotor 16.

Although the fixed magnet 42 may comprise any desired magnet, it should preferably comprise a neodymium magnet because the neodymium magnet is able to generate a relatively large repulsive force. The fixed magnet 42 has an insertion hole 44 defined therein through which the output shaft 20 extends. In other words, the fixed magnet 42 is of a ring shape (an annular shape according to the present embodiment).

The bearing 26 is press-fitted or otherwise secured in the other end of the inner hole 41 of the second housing 14. In FIG. 1A, etc., a roll bearing is illustrated as the bearing 26. However, the bearing 26 may comprise a slide bearing or the like.

Operation of the rotary drive apparatus 10A thus constructed will be described below. While the rotary drive apparatus 10A is being inactivated, the rotor 16 is pressed toward the one end into contact with the stopper 32 under the repulsive force of the fixed magnet 42.

For activating the rotary drive apparatus 10A, the fluid supply source, not shown, supplies the working fluid to the inlet fluid passage 34. The working fluid is introduced from the inlet fluid passage 34 through the joint 36 into the working fluid passage 28, and flows in an axial direction of the rotor 16 until it is applied to one end face of the rotor 16. Therefore, the fluid pressure applied by the working fluid acts on the one end face of the rotor 16.

Figure 1B:
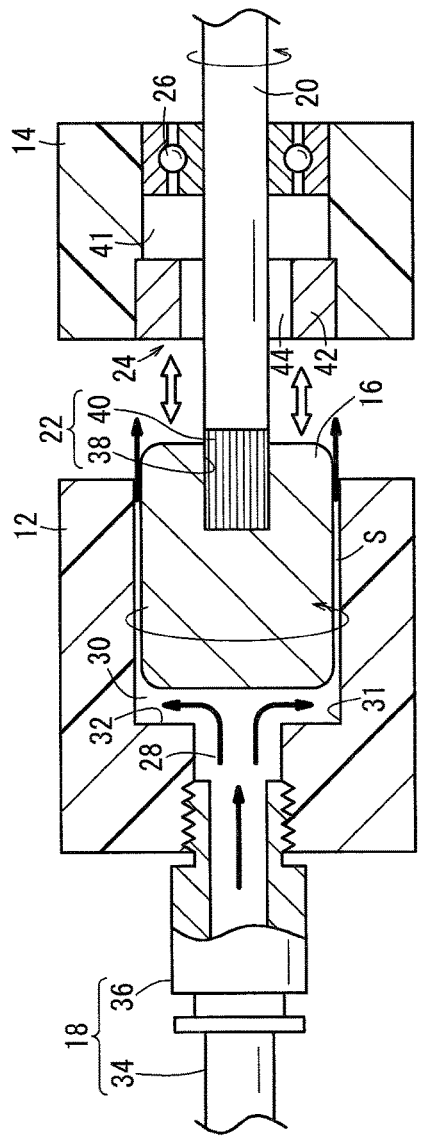
FIG. 1B is a longitudinal cross-sectional view, partly omitted from illustration, of the rotary drive apparatus when it is in operation.

When the pressing force of the working fluid acting on the rotor 16 becomes greater than the repulsive force of the fixed magnet 42, the rotor 16 moves toward the other end and is spaced from the stopper 32 (see FIG. 1B). The rotor 16 stops axially moving at a position wherein the pressing force of the working fluid and the repulsive force of the fixed magnet 42 are kept in equilibrium. In other words, the rotor 16 is not fully dislodged out of the housing hole 30.

The working fluid then flows from the working fluid passage 28 into a space created on the one end of the rotor 16, then flows through the gap S between the outer circumferential surface of the rotor 16 and the inner circumferential surface 31 defining the housing hole 30 and then out of the other open end of the housing hole 30. At this time, the rotor 16 is rotated by an action of the working fluid.

When the rotor 16 is rotated, the output shaft 20 coupled to the rotor 16 is also rotated in unison therewith. Therefore, the rotary power of the rotor 16 is transmitted out of the rotary drive apparatus 10A through the output shaft 20. Since the output shaft 20 is rotatably supported by the bearing 26, the output shaft 20 is prevented from fluctuating.

For inactivating the rotary drive apparatus 10A, the fluid supply source stops supplying the working fluid. Since no fluid pressure is applied to the one end face of the rotor 16, the rotor 16 is pressed toward the one end under the repulsive force of the fixed magnet 42, and stops when brought into contact with the stopper 32.

The inventors of the present application have examined the principles based on which the rotor 16 is rotated by the working fluid. The examined principles based on which the rotor 16 is estimated to rotate will be described in detail below with reference to FIGS. 2A through 6. Each of FIGS. 2A through 6 schematically shows the above-mentioned present embodiment, partly exaggerated or omitted from illustration for illustrative purposes.

Figure 2A:
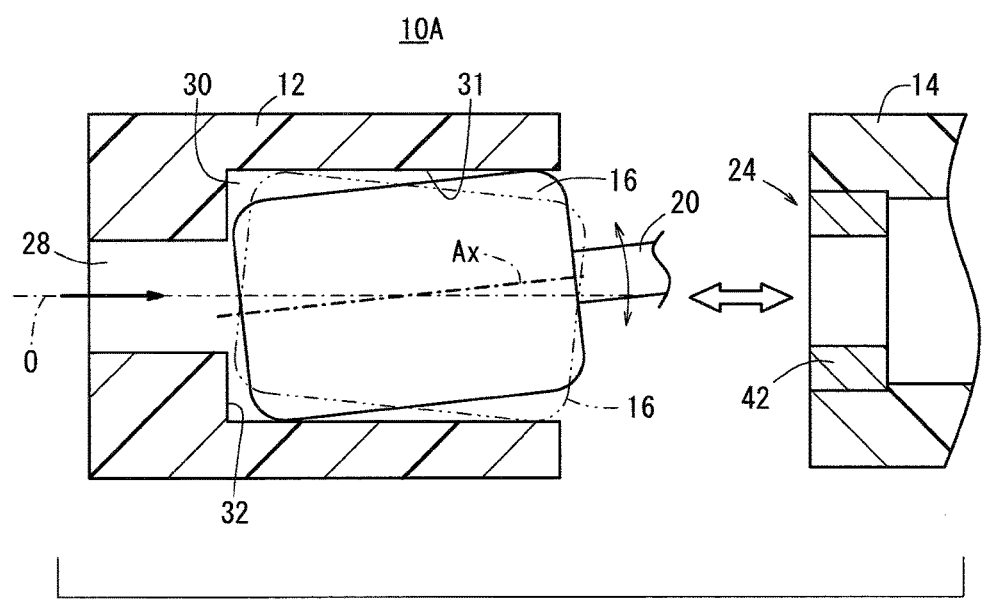
FIG. 2A is a longitudinal cross-sectional view, partly omitted from illustration, showing a first state of the rotary drive apparatus for illustrating the principles based on which a rotor rotates.

As shown in FIG. 2A, when the fluid pressure is applied to the one end face of the rotor 16, the rotor 16 moves away from the stopper 32 toward the other end. In an initial stage wherein the fluid pressure is relatively low, the rotor 16 does not rotate, but swings randomly while striking the inner circumferential surface 31 that defines the housing hole 30 along directions perpendicular to the axis Ax of the rotor 16 and producing vibrational noise. Stated otherwise, the rotor 16 has its axis Ax tilted with respect to the central axis O of the housing hole 30, and repeats its tilting motion randomly.

Figure 2B:
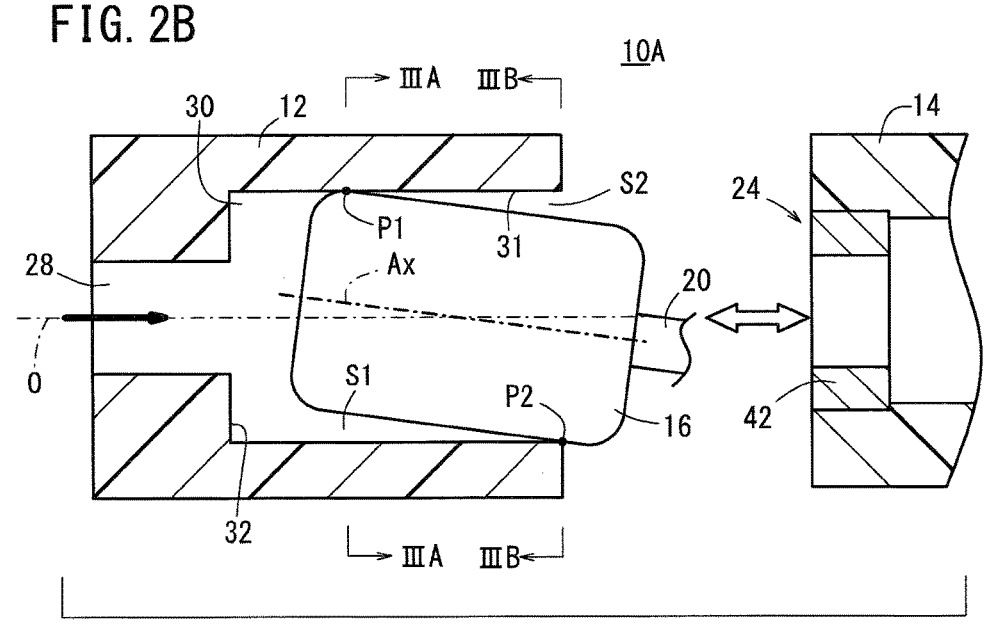
FIG. 2B is a longitudinal cross-sectional view, partly omitted from illustration, showing a second state of the rotary drive apparatus.

As the fluid pressure that is applied to the one end face of the rotor 16 increases, the rotor 16 further moves toward the other end, as shown in FIG. 2B, and undergoes an increased repulsive force from the fixed magnet 42. The rotor 16 stops swinging and is in contact with the inner circumferential surface 31 with the axis Ax tilted to the central axis O.

Figure 3A:
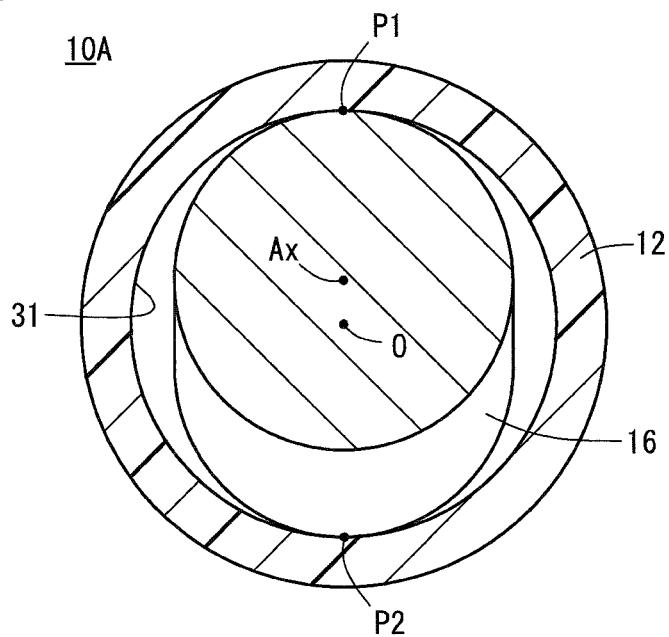
FIG. 3A is a transverse cross-sectional view taken along line IIIA-IIIA of FIG. 2B.
Figure 3B:
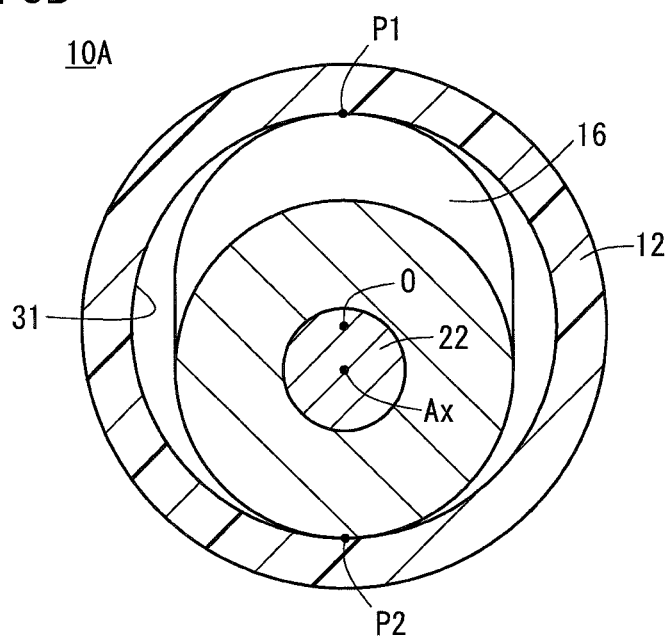
FIG. 3B is a transverse cross-sectional view taken along line IIIB-IIIB of FIG. 2B.

At this time, as shown in FIGS. 3A and 3B, a first point P1 of contact between the outer circumferential surface of the rotor 16 at the one end thereof and the inner circumferential surface 31 that defines the housing hole 30, and a second point P2 of contact between the outer circumferential surface of the rotor 16 at the other end thereof and the inner circumferential surface 31 that defines the housing hole 30 are 180° out of phase with each other in the circumferential directions of the housing hole 30. A relatively large first gap S1 is created at a position near the one end of the rotor 16 which is 180° out of phase with the first point P1 of contact, whereas a relatively large second gap S2 created at a position near the other end of the rotor 16 which is 180° out of phase with the second point P2 of contact (see FIG. 2B).

Figure 4:
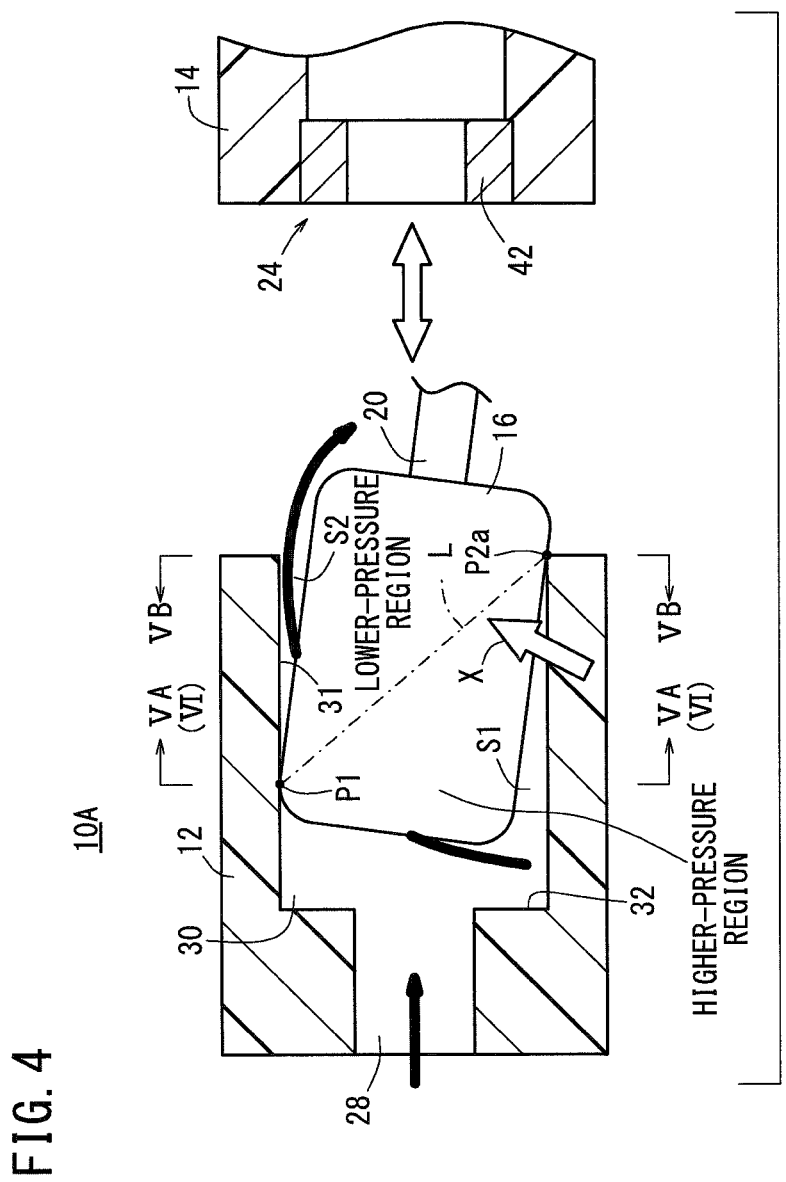
FIG. 4 is a longitudinal cross-sectional view, partly omitted from illustration, showing a third state of the rotary drive apparatus for illustrating the principles based on which the rotor rotates.
Figure 5A:
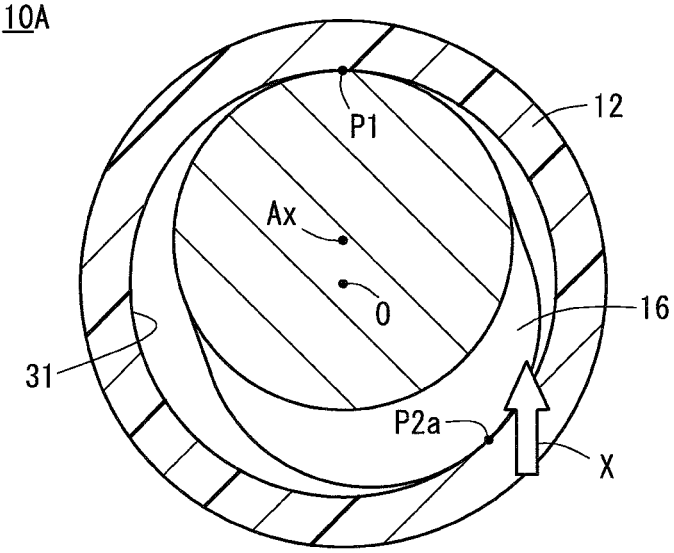
FIG. 5A is a transverse cross-sectional view taken along line VA-VA of FIG. 4.
Figure 5B:
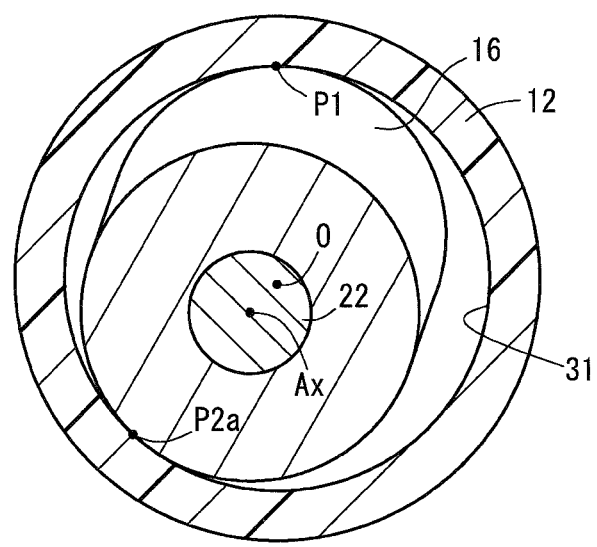
FIG. 5B is a transverse cross-sectional view taken along line VB-VB of FIG. 4.

Upon a further increase in the fluid pressure acting on the one end face of the rotor 16, as shown in FIGS. 4 through 5B, the rotor 16 further moves toward the other end and is subjected to a further increased repulsive force from the fixed magnet 42. The second point P2 of contact is now shifted in a circumferential direction of the housing hole 30, i.e., the phase difference between the first point P1 of contact and the second point P2 of contact is slightly shifted. At this time, the rotor 16 has a second point P2a of contact. In other words, the first point P1 of contact and the second point P2a of contact are out of phase with each other by an angle slightly shifted from 180°.

Then, on the outer circumferential surface of the rotor 16, the gap between a shortest line segment L interconnecting the first point P1 of contact and the second point P2a of contact and the inner circumferential surface 31 becomes relatively smaller. In a region (first region) extending from the line segment L toward the one end face of the rotor 16, the pressure of the working fluid is not much reduced from the pressure in the fluid supply source. In contrast, in a region (second region) extending from the line segment L toward the other end face of the rotor 16, the pressure of the working fluid is appropriately lower than in the first region as the flow rate of the working fluid is restricted.

The working fluid does not flow in a space (a space with a higher pressure, a space near the line segment L) that is reduced because the phase angle is changed, but flow in a space (a space with a lower pressure) that is widened because the phase angle is changed. As the working fluid goes closer to the outlet where the pressure is lower, the speed at which the working fluid flows becomes higher, i.e., the pressure of the working fluid becomes lower.

As a consequence, the rotor 16 undergoes a thrust force along the direction indicated by the arrow X, and revolves about its own axis while the phase difference between the first point P1 of contact and the second point P2a of contact is being maintained, due to friction between the working fluid flowing in a space that is wider from the first gap S1 toward the second gap S2 and the outer circumferential surface of the rotor 16.

Figure 6:
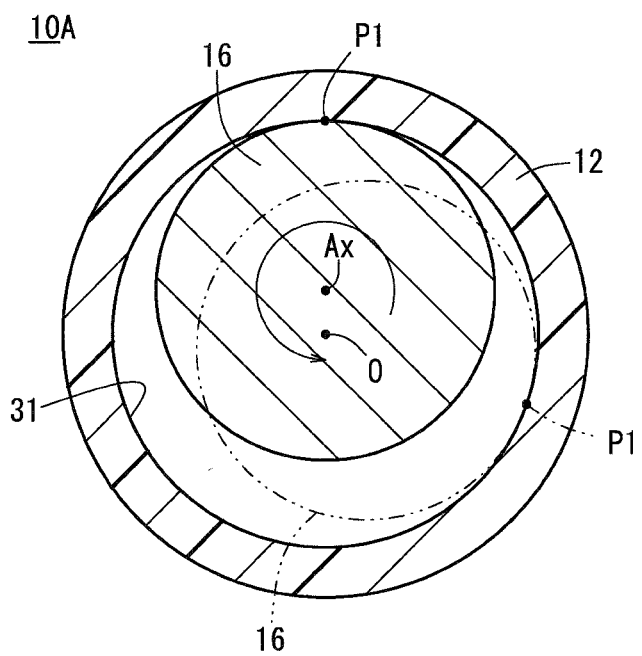
FIG. 6 is a transverse cross-sectional view illustrating the manner in which the rotor rotates.

In other words, as shown in FIG. 6, the rotor 16 revolves about its own axis counterclockwise with respect to a direction as viewed from the one end face of the rotor 16, and at the same time rotates clockwise along the inner circumferential surface 31 that defines the housing hole 30. Once the rotor 16 starts to rotate, the rotor 16 continuously rotates stably while the phase difference between the first point P1 of contact and the second point P2a of contact is being maintained. If the second point P2 of contact is shifted in a direction away from the second point P2a of contact in FIGS. 5A and 5B, then the rotor 16 revolves about its own axis clockwise with respect to a direction as viewed from the one end of the rotor 16, and at the same time rotates counterclockwise along the inner circumferential surface 31 that defines the housing hole 30.

With the rotary drive apparatus 10A according to the present embodiment, as described above, while the gap S is being created between the outer circumferential surface of the cylindrical rotor 16 disposed in the housing hole 30 and the inner circumferential surface 31 that defines the housing hole 30, the fluid pressure is applied to the one end face of the rotor 16, and the working fluid flows through the gap S. Consequently, the rotor 16 is rotated and the rotary power of the rotor 16 is transmitted from the output shaft 20. The rotary drive apparatus 10A can be simplified and small in size and can be manufactured at a reduced cost.

As the rotary drive apparatus 10A has the fixed magnet 42 (motion limiter 24) for limiting motion of the rotor 16 toward the other end, when the fluid pressure is applied to the one end face of the rotor 16 to move the rotor 16 toward the other end, the rotor 16 is prevented from being fully dislodged out of the housing hole 30.

If the rotor 16 is made of a neodymium magnet (magnet) and the first housing 12 is made of polyacetal, then the rotor 16 can reliably be rotated even under a relatively low pressure (working pressure) of the working fluid. This will also be described later in a first inventive example and a second inventive example.

According to the present embodiment, since the fixed magnet 42 is disposed in facing relation to the other end face of the rotor 16, motion of the rotor 16 toward the other end is limited in a contactless fashion under the repulsive force of the fixed magnet 42. In other words, inasmuch as there is no contact resistance (friction) is developed between the rotor 16 and the fixed magnet 42, the rotary power of the rotor 16 is prevented from being reduced by limiting motion of the rotor 16.

The output shaft 20 extends through the insertion hole 44 in the fixed magnet 42 while being held in coaxial alignment with the rotor 16. Therefore, the rotary drive apparatus 10A is made small in size.

Furthermore, since motion of the rotor 16 toward the one end under the repulsive force of the fixed magnet 42 is limited by the stopper 32, the position of the rotor 16 is kept substantially constant with respect to the housing hole 30 while the rotor 16 is held at rest. Consequently, the rotational characteristics of the rotor 16 are prevented from varying each time the rotary drive apparatus 10A is activated.

According to the present embodiment, the rotor 16 and the output shaft 20 are coupled to each other through the power transmitter 22. Therefore, the rotary power of the rotor 16 can reliably be transmitted to the output shaft 20.

The present embodiment is not limited to the above structural details. The rotor 16 and the output shaft 20 of the rotary drive apparatus 10A may be integral with each other. According to such a modification, since the power transmitter 22 may be dispensed with, the rotary power of the rotor 16 may be available directly as the rotary power of the output shaft 20.

Second Embodiment

A rotary drive apparatus 10B according to a second embodiment of the present invention will be described below with reference to FIG. 7. Those components of the rotary drive apparatus 10B according to the second embodiment which are identical to those of the rotary drive apparatus 10A according to the first embodiment are denoted by identical reference characters, and hence will not be described in detail below. The same holds true for a fourth embodiment and a fifth embodiment to be described later.

Figure 7:
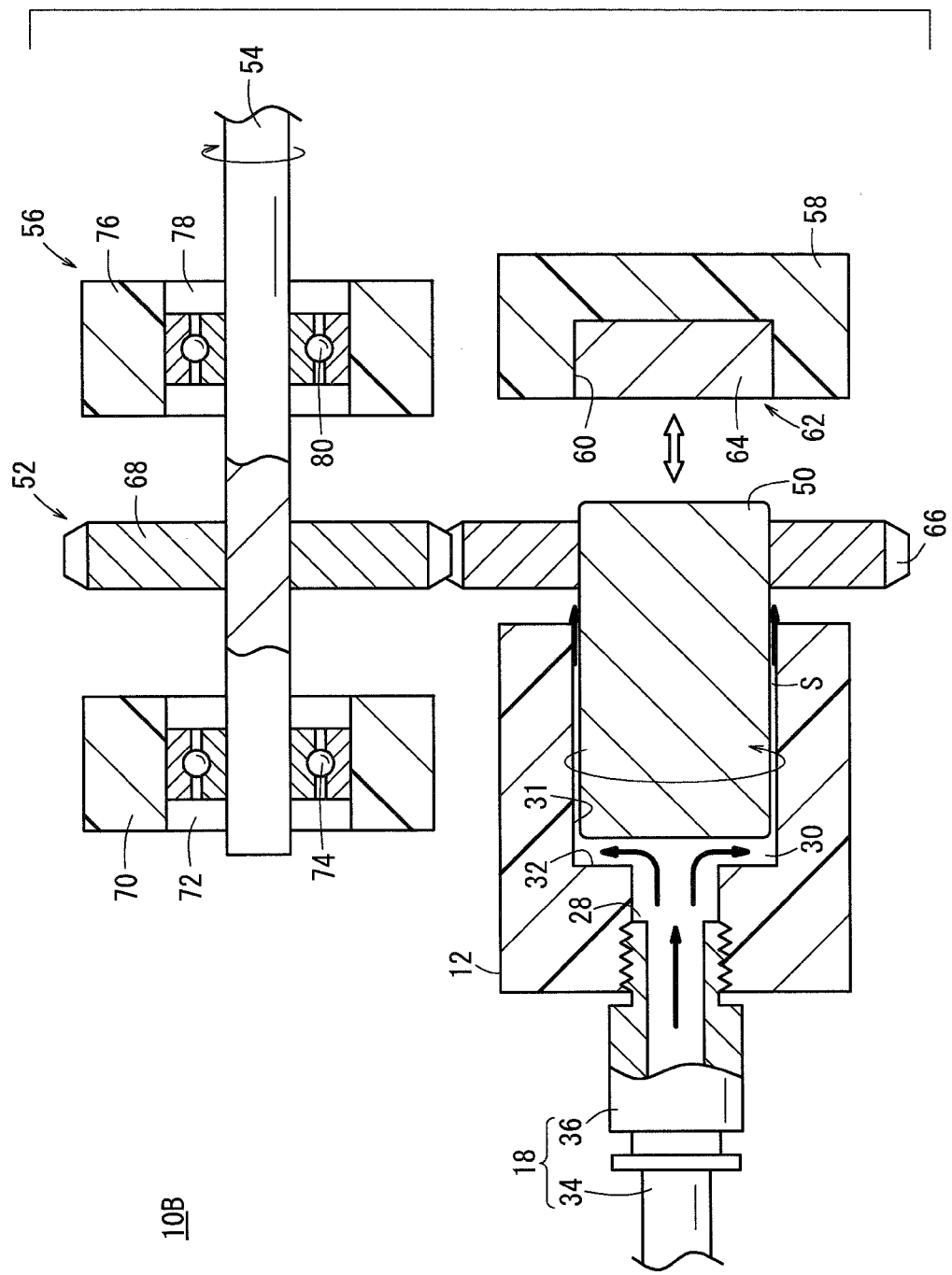
FIG. 7 is a longitudinal cross-sectional view, partly omitted from illustration, of a rotary drive apparatus according to a second embodiment of the present invention.

As shown in FIG. 7, the rotary drive apparatus 10B has a rotor 50 disposed in the housing hole 30 in the first housing 12 and partly projecting out of the housing hole 30, a power transmitter (power transmitting unit) 52 disposed on the other end of the rotor 50, an output shaft 54 extending parallel to the axis of the rotor 50, and a support mechanism 56 rotatably supporting the output shaft 54. According to the present embodiment, a disk-shaped fixed magnet 64 of a motion limiter 62 is press-fitted or otherwise secured in a hole 60 defined in a second housing 58 which has a substantially U-shaped cross section.

The entire length of the rotor 50 is greater than the depth of the housing hole 30. Therefore, when the rotor 50 is at rest with its one end face held in contact with the stopper 32, the other end of the rotor 50 projects out of the housing hole 30. When the rotor 50 is at rest, the power transmitter 52 is thus prevented from engaging the first housing 12.

The power transmitter 52 is constructed as a gear mechanism having a first gear 66 fixed to the other end of the rotor 50 and a second gear 68 fixed to an output shaft 54 and held in mesh with the first gear 66.

The support mechanism 56 has a first support 70 in the form of a hollow cylinder, a first bearing 74 disposed in an inner bore 72 that is defined in the first support 70 and rotatably supporting one end portion of the output shaft 54, a second support 76 in the form of a hollow cylinder, and a second bearing 80 disposed in an inner bore 78 defined in the second support 76 and rotatably supporting another end portion of the output shaft 54. In FIG. 7, each of the first bearing 74 and the second bearing 80 is illustrated as a roll bearing. However, each of the first bearing 74 and the second bearing 80 may comprise a slide bearing or the like.

The rotary drive apparatus 10B according to the present embodiment offers the same advantages as the rotary drive apparatus 10A according to the first embodiment. The present embodiment is not limited to the above structural details. For example, the power transmitter 52 is not limited to the gear mechanism, but may be of a structure using a V belt, a chain, or the like.

Third Embodiment

A rotary drive apparatus 10C according to a third embodiment of the present invention will be described below with reference to FIG. 8. Those components of the rotary drive apparatus 10C according to the third embodiment which are identical to those of the rotary drive apparatus 10B according to the second embodiment are denoted by identical reference characters, and hence will not be described in detail below.

Figure 8:
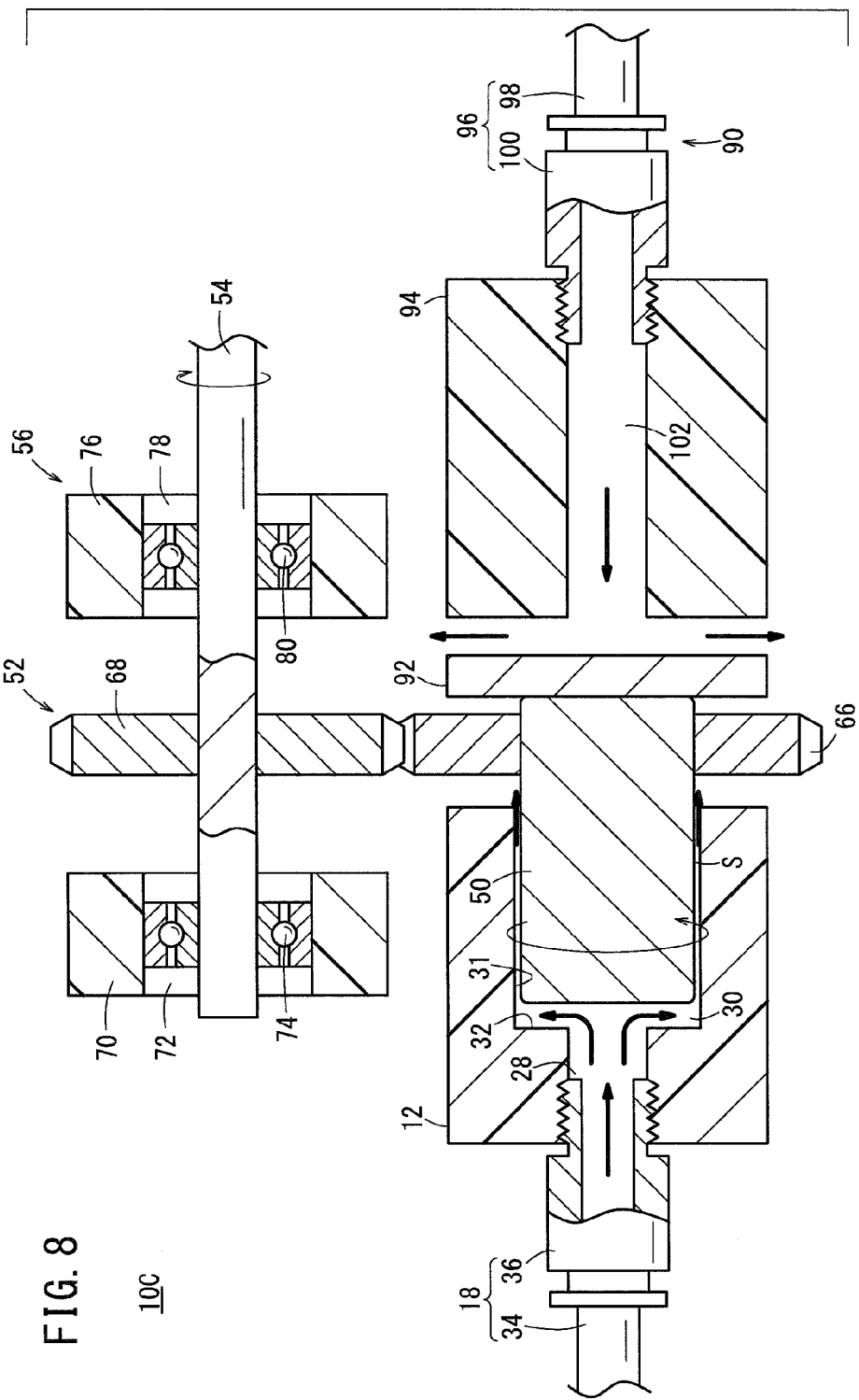
FIG. 8 is a longitudinal cross-sectional view, partly omitted from illustration, of a rotary drive apparatus according to a third embodiment of the present invention.

As shown in FIG. 8, the rotary drive apparatus 10C includes a motion limiter 90 which is different in structure from the motion limiter 62 of the rotary drive apparatus 10B. The motion limiter 90 of the rotary drive apparatus 10C has a pressure bearing member (pressure bearing plate) 92 fixed to the other end face of the rotor 50 and a fluid supply assembly 96 mounted on a second housing 94 for supplying a fluid for pressing the pressure bearing member 92 toward the one end of the rotor 50.

The pressure bearing member 92 is in the form of a disk having an outside diameter greater than the outside diameter of the rotor 50. In other words, the pressure bearing member 92 extends radially outwardly of the rotor 50. The second housing 94, which is in the form of a hollow cylinder, is spaced from the pressure bearing member 92.

The fluid supply assembly 96 has an inlet fluid passage 98 for introducing a working fluid from a fluid supply source, not shown, and a joint 100 coupling the inlet fluid passage 98 to the second housing 94. The joint 100 is threaded into another open end of an inner hole (fluid passage) 102 defined in the second housing 94. The inlet fluid passage 98 is held in fluid communication with the inner hole 102 in the second housing 94 through the joint 100.

The fluid that is introduced into the inner hole 102 in the second housing 94 comprises any of various fluids including air, water, oil, etc. The fluid may be identical to or different from the drive fluid. If the fluid is identical to the drive fluid, then since the fluid supply source may be shared by the drive fluid, the rotary drive apparatus 10C may be simpler in structure.

With the rotary drive apparatus 10C, the rotor 50 may be made of a material, e.g., a metal material, a polymeric material, or the like, other than a magnet, and the first housing 12 may be made of a material, e.g., a metal material, other than a nonmagnetic material.

According to the present embodiment, the fluid introduced from the fluid supply source, not shown, into the inlet fluid passage 98 flows through the joint 100 and the inner hole 102 in the second housing 94, impinges on the other end face of the pressure bearing member 92, and flows out through the gap between the pressure bearing member 92 and the second housing 94. Since the pressure bearing member 92 is pressed toward the one end of the rotor 50, the rotor 50 is limited against motion toward the other end thereof.

The rotary drive apparatus 10C according to the present embodiment offers the same advantages as the rotary drive apparatus 10B according to the second embodiment. According to the present embodiment, furthermore, as the pressure bearing member 92 on the other end of the rotor 50 is pressed toward the one end of the rotor 50 by the fluid introduced from the inlet fluid passage 98, the rotor 50 is reliably limited against motion toward the other end thereof. Since the pressure bearing member 92 extends radially outwardly of the rotor 50, the fluid flowing out of the inner hole 102 in the second housing 94 is prevented from flowing into the housing hole 30 in the first housing 12, and the pressure-bearing area of the pressure bearing member 92 for being contacted by the fluid is made relatively large.

The present embodiment is not limited to the above structural details. The pressure bearing member 92 may be fixed to the outer circumferential surface of the rotor 50 at the other end thereof. In other words, the pressure bearing member 92 may comprise an annular member. The annular pressure bearing member 92 offers the same advantages as the above structural details.

Fourth Embodiment

Figure 9:
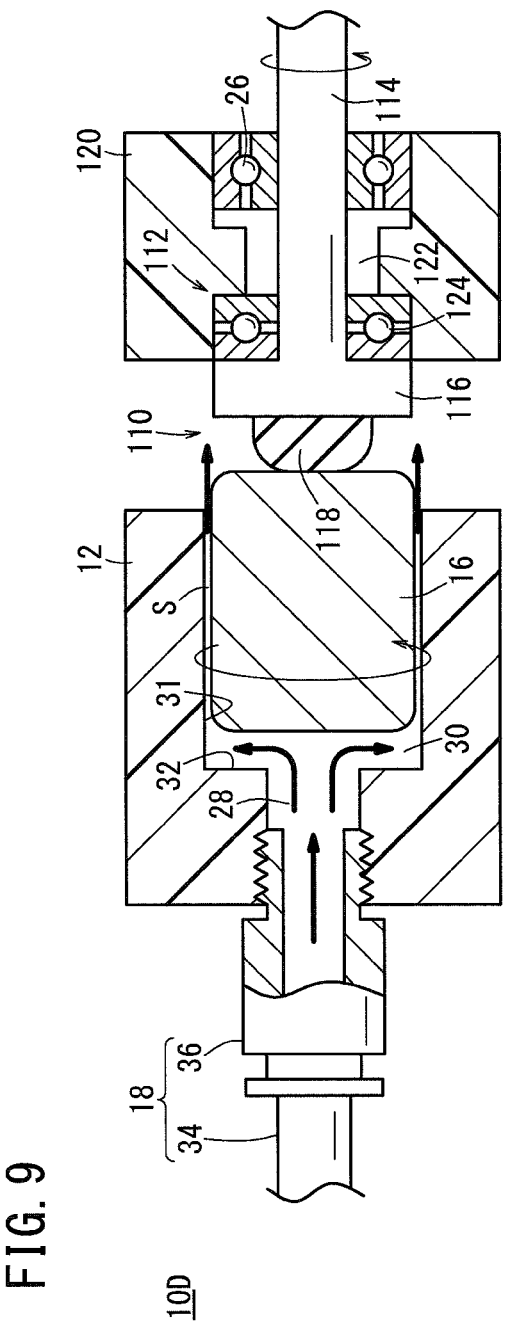
FIG. 9 is a longitudinal cross-sectional view, partly omitted from illustration, of a rotary drive apparatus according to a fourth embodiment of the present invention.

A rotary drive apparatus 10D according to a fourth embodiment of the present invention will be described below with reference to FIG. 9. As shown in FIG. 9, the rotary drive apparatus 10D has a power transmitter (power transmitting unit) 110 and a motion limiter 112 which are different in structure from the power transmitter 22 and the motion limiter 24 of the rotary drive apparatus 10A according to the first embodiment.

The power transmitter 110 of the rotary drive apparatus 10D has a clutch 118 disposed on an increased-diameter portion 116 of an output shaft 114 at one end thereof. The clutch 118 develops appropriate friction and is elastically deformable when held in contact with the other end face of the rotor 16. The clutch 118 is made of a resin material such as rubber or the like.

The motion limiter 112 has a thrust bearing 124 press-fitted or otherwise secured in one end of an inner hole 122 defined in a second housing 120. The thrust bearing 124 bears a force directed toward the other end of the output shaft 114.

According to the present embodiment, when the fluid pressure is applied to the one end face of the rotor 16, moving the rotor 16 toward the other end, the other end face of the rotor 16 is brought into contact with the clutch 118. The clutch 118 is now compressed and held in intimate contact with the other end face of the rotor 16. In other words, the clutch 118 couples (connects) the rotor 16 and the output shaft 114 to each other, so that rotary power of the rotor 16 is transmitted to the output shaft 114, rotating the output shaft 114.

Since the thrust bearing 124 bears a force directed toward the other end of the output shaft 114 at this time, the rotor 16 held in contact with the clutch 118 is limited against motion toward the other end. Therefore, the rotor 16 is prevented from being fully dislodged out of the housing hole 30.

When the working fluid stops being supplied from the non-illustrated fluid supply source, the rotor 16 is pressed toward the one end under the resilient force (restoring force) from the clutch 118. The rotor 16 is now brought to a stop upon contact with the stopper 32.

With the rotary drive apparatus 10D, the rotor 16 may be made of a material, e.g., a metal material, a polymeric material, or the like, other than a magnet, and the first housing 12 may be made of a material, e.g., a metal material, other than a nonmagnetic material. The rotary drive apparatus 10D according to the present embodiment offers the same advantages as the rotary drive apparatus 10A according to the first embodiment.

Fifth Embodiment

A rotary drive apparatus 10E according to a fifth embodiment of the present invention will be described below with reference to FIGS. 10A and 10B. As shown in FIG. 10A, the rotary drive apparatus 10E has a power transmitter (power transmitting unit) 130 which is different in structure from the power transmitter 22 of the rotary drive apparatus 10A according to the first embodiment.

The power transmitter 130 of the rotary drive apparatus 10E has a bore 132 defined in the other end face of the rotor 16, a pin 134 press-fitted in the bore 132, and a joint tube 142 joining a reduced-diameter portion 136 on the other end of the pin 134 and a reduced-diameter portion 140 on one end of an output shaft 138 to each other.

The joint tube 142, which is elastically deformable, has one end in which the reduced-diameter portion 136 of the pin 134 is firmly fitted and another end in which the reduced-diameter portion 140 of the output shaft 138 is firmly fitted. With the rotor 16 held in contact with the stopper 32, as shown in FIG. 10A, the joint tube 142 extends through the insertion hole 44 in the fixed magnet 42. The joint tube 142 may be made of a flexible material such as silicone rubber or the like, for example.

The rotary drive apparatus 10E according to the present embodiment offers the same advantages as the rotary drive apparatus 10A according to the first embodiment. Furthermore, as shown in FIG. 10B, when the rotary drive apparatus 10E starts to be activated, even if the rotor 16 is tilted or displaced off-center, the joint tube 142 is elastically deformed based on the movement of the rotor 16, i.e., to flexibly absorb the movement of the rotor 16. Consequently, the output shaft 138 is prevented from being tilted or displaced off-center in unison with the rotor 16.

Sixth Embodiment

Figure 11:
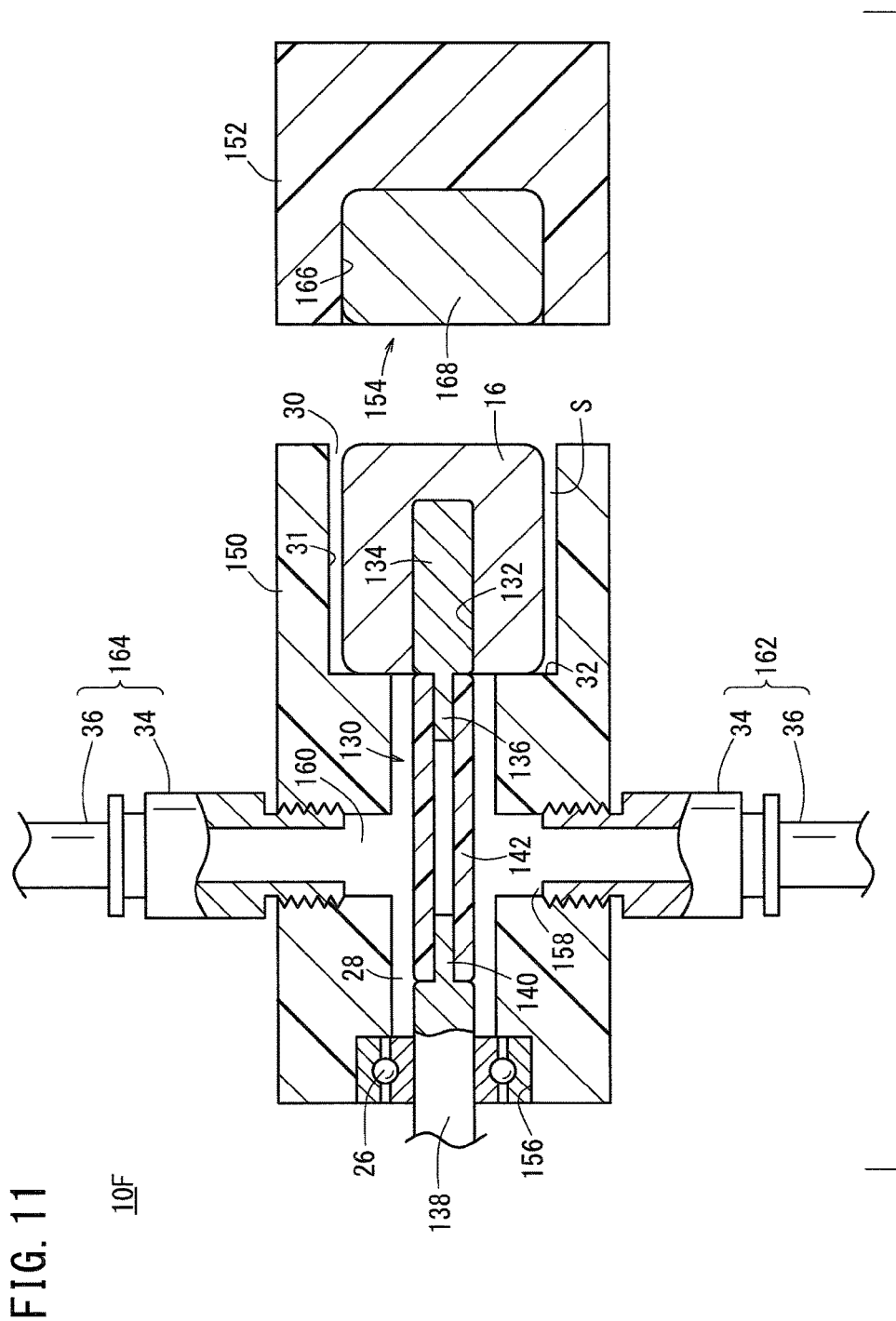
FIG. 11 is a longitudinal cross-sectional view, partly omitted from illustration, of a rotary drive apparatus according to a sixth embodiment of the present invention.

A rotary drive apparatus 10F according to a sixth embodiment of the present invention will be described below with reference to FIG. 11. As shown in FIG. 11, those parts of the rotary drive apparatus 10F which are identical to those of the rotary drive apparatus 10E according to the fifth embodiment are denoted by identical reference characters, and hence will not be described in detail below.

As shown in FIG. 11, the rotary drive apparatus 10F has a first housing 150 having a tubular shape, a power transmitter 130 for transmitting rotary power of the rotor 16 disposed in the first housing 150 to an output shaft 138 on one end of the rotor 16, a motion limiter 154 disposed in a second housing 152 for limiting motion of the rotor 16 toward the other end, and a bearing 26 disposed in the first housing 150 and rotatably supporting the output shaft 138.

The first housing 150 has a bearing hole 156 defined in one end thereof with the bearing 26 being press-fitted therein, a working fluid passage 28 held in fluid communication with the bearing hole 156, and a housing hole 30 defined in the other end of the first housing 150 and held in fluid communication with the working fluid passage 28. The power transmitter 130 includes a joint tube 142 disposed in the working fluid passage 28. The first housing 150 also has a pair of supply ports 158, 160 defined therein for introducing a working fluid into the working fluid passage 28, the supply ports 158, 160 being open in a wall surface that defines the working fluid passage 28.

A fluid supply assembly 162 is connected to the supply port 158, and a fluid supply assembly 164 is connected to the supply port 160. Each of the fluid supply assemblies 162, 164 has an inlet fluid passage 34 and a joint 36, and is of the same structure as the fluid supply assembly 18 according to the first embodiment.

The motion limiter 154 has a fixed magnet 168 press-fitted or otherwise secured in a hole 166 defined in the second housing 152 which has a substantially U-shaped cross section. For example, the fixed magnet 168 is in the form of a disk for applying a repulsive force to the rotor 16.

The rotary drive apparatus 10F according to the present embodiment offers the same advantages as the rotary drive apparatus 10E according to the fifth embodiment. Furthermore, since the output shaft 138 is disposed on a side of the rotor 16 which is remote from the fixed magnet 168, and the power transmitter 130 (the joint tube 142, etc.) is disposed in the working fluid passage 28 which guides the working fluid to the rotor 16, the fixed magnet 168 does not need to have a hole defined therein for the joint tube 142, etc. to extend therethrough. In other words, according to the present embodiment, as the fixed magnet 168 is solid, it is capable of applying a stronger repulsive force to the rotor 16 than a hollow fixed magnet having the same diameter as the fixed magnet 168. The rotor 16 can thus be rotated more stably.

The present invention will further be described with reference to inventive examples.

First Inventive Example

Figure 12:
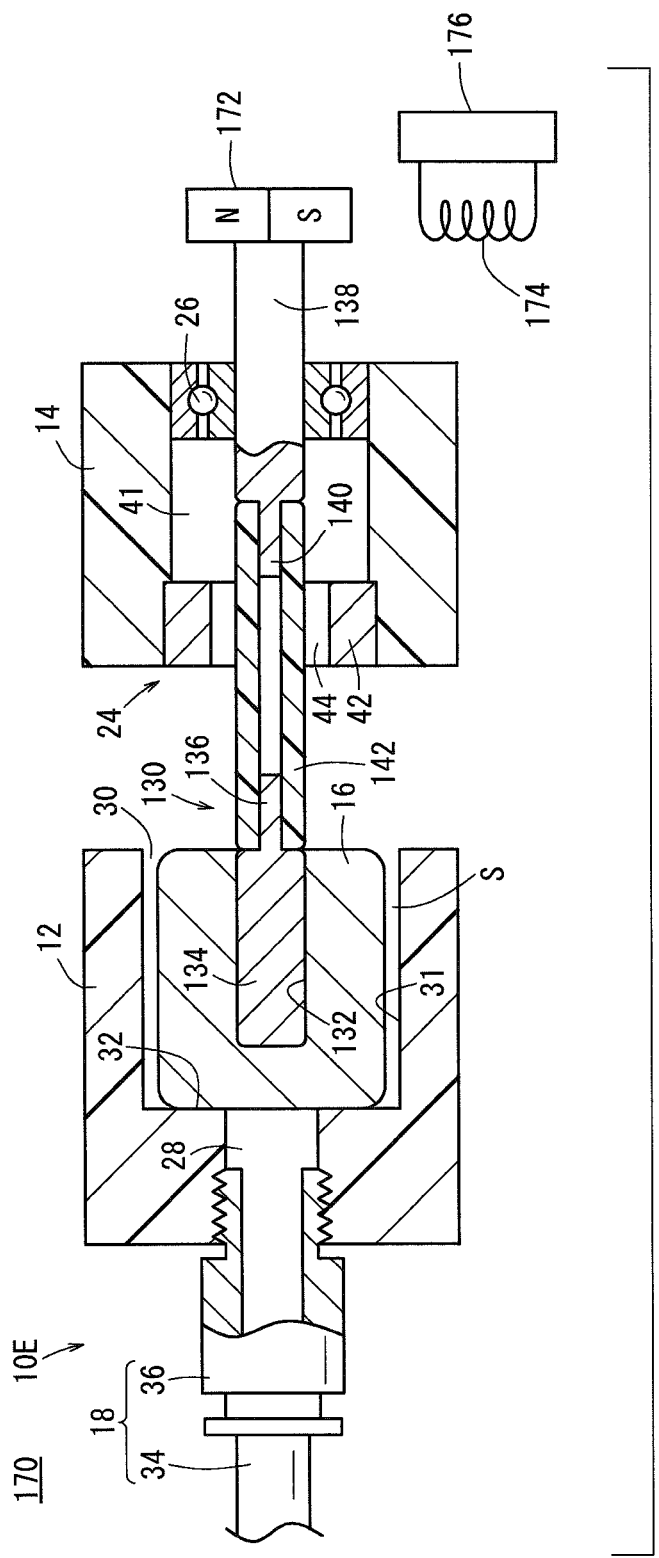
FIG. 12 is a longitudinal cross-sectional view, partly omitted from illustration, of a first experimental device according to a first inventive example.

First, an experimental device (first experimental device) 170 according to a first inventive example will be described below. As shown in FIG. 12, the first experimental device 170 includes the rotary drive apparatus 10E according to the fifth embodiment, a detecting magnet 172 fixed to the other end of the output shaft 138 of the rotary drive apparatus 10E, a coil 174 disposed near the detecting magnet 172, and a measuring unit (oscilloscope) 176 for measuring an induced current (voltage) generated in the coil 174. Each of the rotor 16 and the fixed magnet 42 is made of a neodymium magnet.

The detecting magnet 172 is fixed to the output shaft 138 such that its N and S poles are positioned along a direction perpendicular to the axis of the output shaft 138. When the output shaft 138 rotates about its own axis, the relative positions of the N pole (S pole) of the detecting magnet 172 and the coil 174 change in predetermined periodic cycles. At this time, the coil 174 generates an induced current by way of electromagnetic induction.

Experimental conditions in the first inventive example will be described below. According to the first inventive example, three first housings 12 made of polyacetal, polyurethane, and aluminum, respectively, were used, and the pressure of the working fluid (working pressure) applied to the rotor 16 was changed stepwise. In the present inventive example, the waveform of a voltage based on the induced current flowing through the coil 174 was acquired under the above experimental conditions, and the rotational speed of the output shaft 138 was calculated from the acquired voltage waveform.

Figure 13:
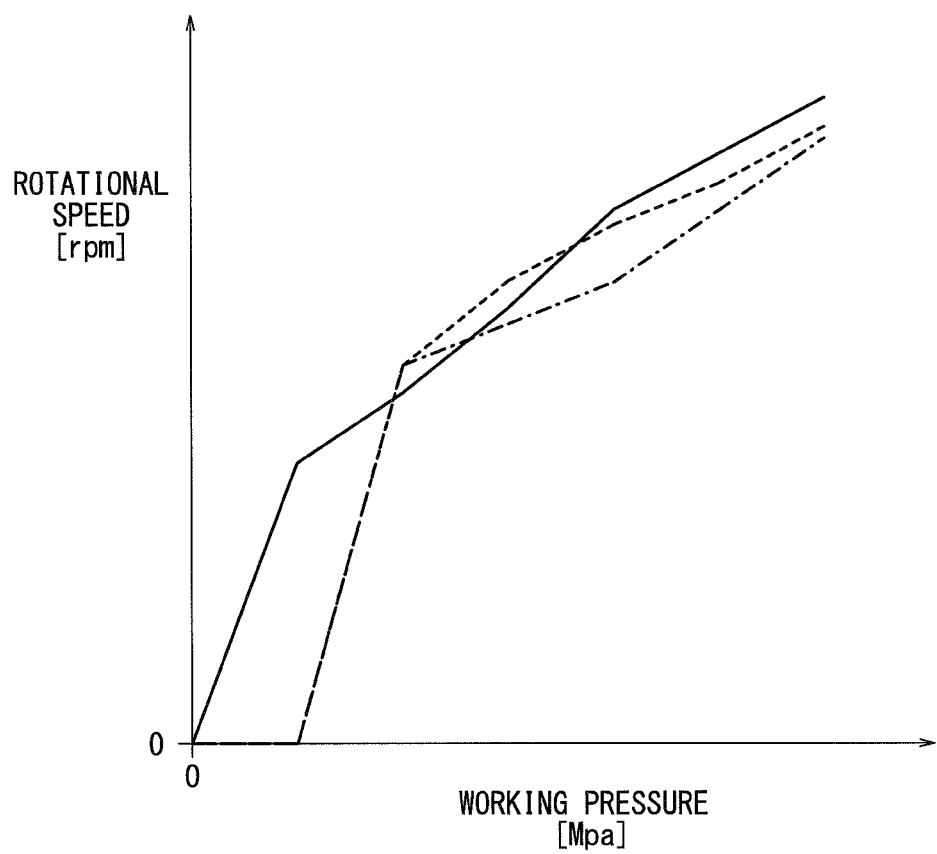
FIG. 13 is a graph showing the results of an experiment conducted by the first experimental device.

The results of the experiment according to the first inventive example are shown in. FIG. 13. FIG. 13 is a graph showing rotational speeds plotted against working pressures on the various first housings 12. The graph shows a solid-line curve representing the experimental result of the first housing 12 made of polyacetal, a broken-line curve representing the experimental result of the first housing 12 made of polyurethane, and a dot-and-dash-line curve representing the experimental result of the first housing 12 made of aluminum.

As can be seen from FIG. 13, rotation of the output shaft 138 was observed with respect to all the three first housings 12. Stated otherwise, the experiment proved that the rotor 16 was rotated and its rotary power was extracted from the output shaft 138 by applying the fluid pressure to the one end face of the rotor 16 and passing the working fluid through the gap S created between the outer circumferential surface of the cylindrical rotor 16 disposed in the housing hole 30 and the inner circumferential surface 31 defining the housing hole 30.

When the first housing 12 of polyacetal was used, rotation of the output shaft 138 was observed in a low-pressure range (0.05 MPa) of the working fluid in which the output shaft 138 was not rotated when the first housings 12 of polyurethane and aluminum were used.

Second Inventive Example

Figure 14:
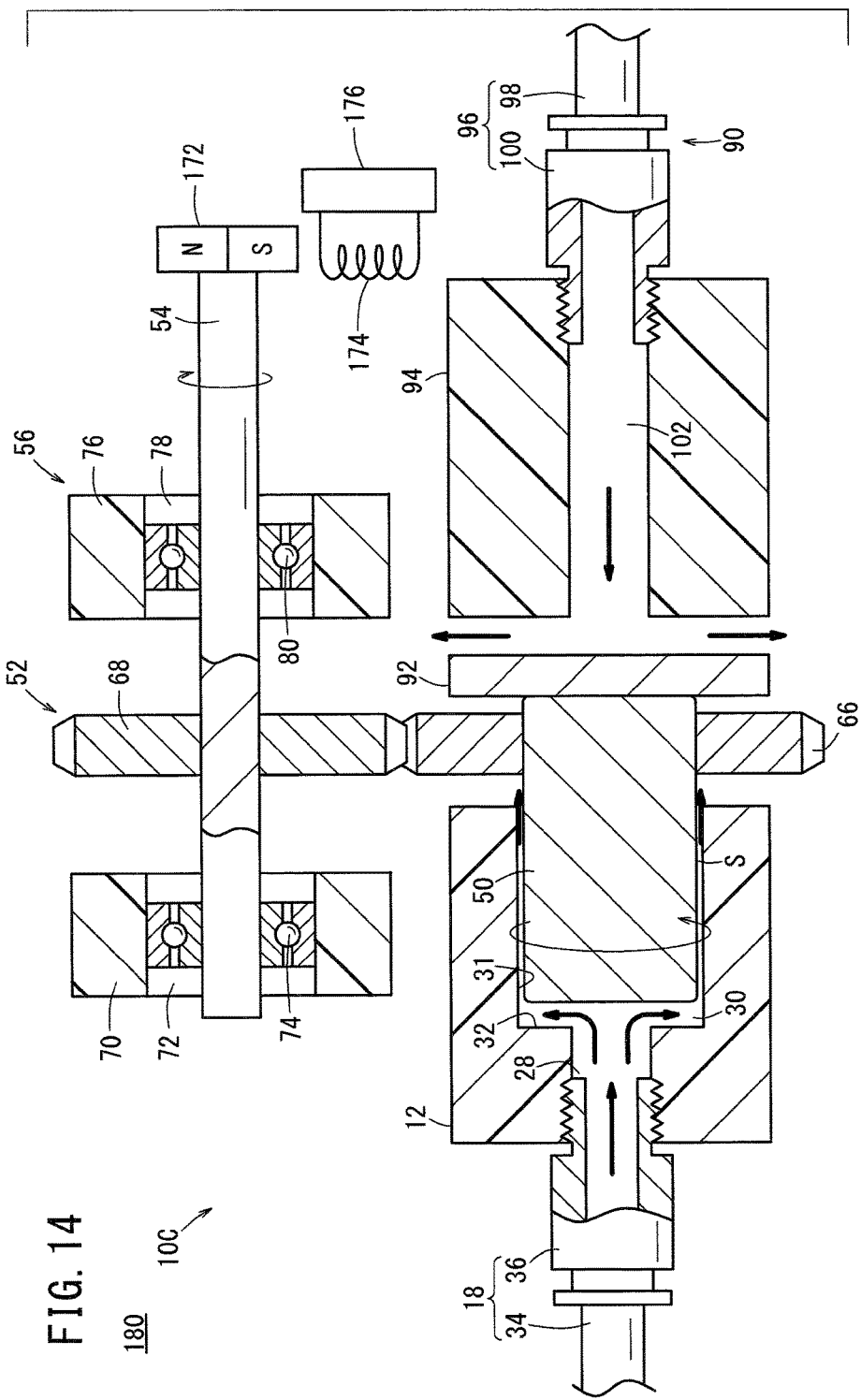
FIG. 14 is a longitudinal cross-sectional view, partly omitted from illustration, of a second experimental device according to a second inventive example.

An experimental device (second experimental device) 180 according to a second inventive example will be described below. As shown in FIG. 14, the second experimental device 180 includes the rotary drive apparatus 10C according to the third embodiment, and a detecting magnet 172, a coil 174, and a measuring unit 176 which are identical to those of the first experimental device 170. In the second experimental device 180, the detecting magnet 172 is fixed to the other end of the output shaft 54 of the rotary drive apparatus 10C. The rotor 50 is made of a neodymium magnet.

Figure 15:
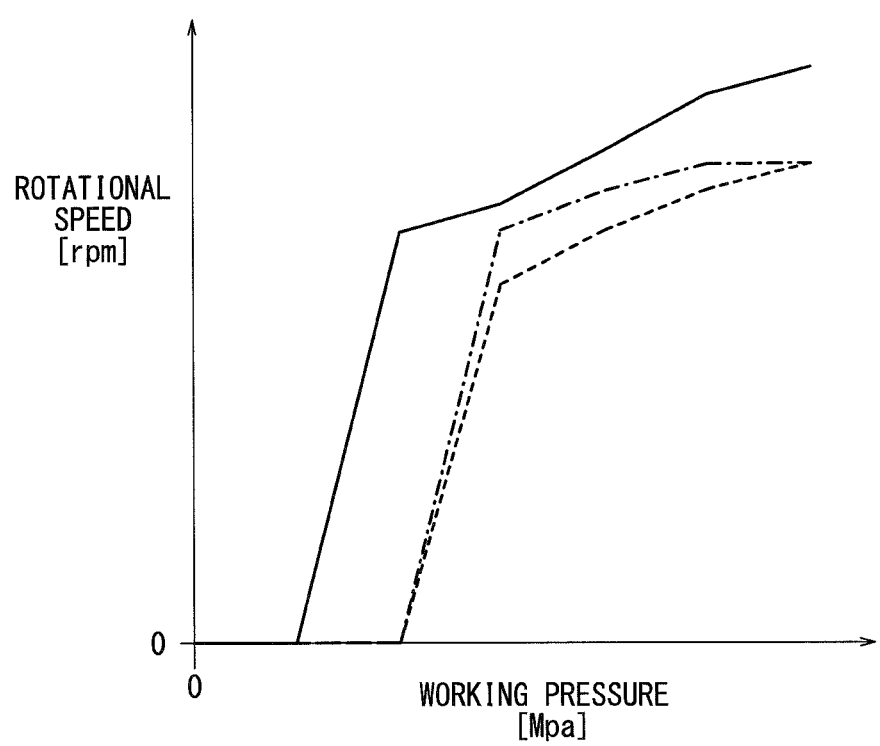
FIG. 15 is a graph showing the results of an experiment conducted by the second experimental device.

Experimental conditions according to the second inventive example are identical to those according to the first inventive example, and hence will not be described below. The results of an experiment according to the second inventive example are shown in FIG. 15. FIG. 15 is a graph similar to FIG. 13. The graph shows a solid-line curve representing the experimental result of the first housing 12 made of polyacetal, a broken-line curve representing the experimental result of the first housing 12 made of polyurethane, and a dot-and-dash-line curve representing the experimental result of the first housing 12 made of aluminum.

As can be seen from FIG. 15, even when the second experimental device 180 was used, rotation of the output shaft 54 was observed with respect to all the three first housings 12. Stated otherwise, the experiment proved that the rotor 16 was rotated and its rotary power was extracted from the output shaft 54 by applying the fluid pressure to the one end face of the rotor 16 and passing the working fluid through the gap S created between the outer circumferential surfaced of the cylindrical rotor 16 disposed in the housing hole 30 and the inner circumferential surface 31 defining the housing hole 30.

When the first housing 12 of polyacetal was used, rotation of the output shaft 54 was observed in a low-pressure range (0.10 MPa) of the working fluid in which the output shaft 54 was not rotated when the first housings 12 of polyurethane and aluminum were used. Furthermore, when the first housing 12 of polyacetal was used, it was observed that the rotational speed of the output shaft 54 was higher than when the other two first housings 12 were used, in a full range of working pressures in the experiment.

The rotary drive apparatuses 10A through 10F according to the first through sixth embodiments can be used in various applications. For example, if an electric generator is connected to the output shafts 20, 54, 114, 138 of the rotary drive apparatuses 10A through 10F, then the rotary drive apparatuses can be used as an electric energy generating apparatus. If a fan or the like is connected to the output shafts 20, 54, 114, 138, then the rotary drive apparatuses can be used as an air blower.

The present invention is not limited to the illustrated embodiments, but many changes and modifications can be made to the embodiments without departing from the scope of the present invention.

The invention claimed is:

1. A rotary drive apparatus comprising:
    a cylindrical rotor having a first end face and a second end face, said cylindrical rotor having a constant outer diameter over an entire length of the rotor and being axially movable;
    a housing having a housing hole defined therein, said housing hole having a constant inner diameter over an entire length of the housing hole, the rotor being disposed in the housing hole;
    a working fluid passage extending towards the first end face through which a working fluid flows to apply a fluid pressure to the first end face of the rotor;
    a motion limiting unit configured to limit axial motion of the rotor toward the second end face of the rotor and to force the rotor against the working fluid passage; and
    an output shaft connected to only one end of the rotor and being configured to extract rotary power of the rotor out of the rotary drive apparatus,
    wherein a predetermined gap for the working fluid to flow therethrough is created between an outer circumferential surface of the rotor and a wall surface defining the housing hole,
    wherein the rotor rotates while being in contact with the wall surface with an axis of the rotor tilted to a central axis of the housing hole, by application of the working fluid, and
    wherein the working fluid passage open toward the housing hole is formed on the wall surface defining the housing hole and opposing the first end face of the rotor.

2. The rotary drive apparatus according to claim 1, wherein the rotor is made of a magnet; and
    the housing is made of a nonmagnetic material.

3. The rotary drive apparatus according to claim 2, wherein the rotor is made of a neodymium magnet; and
    the housing is made of polyacetal.

4. The rotary drive apparatus according to claim 2, wherein the motion limiting unit has a fixed magnet configured to repel the rotor in facing relation to the second end face of the rotor to press the rotor towards the working fluid passage.

5. The rotary drive apparatus according to claim 4, wherein the fixed magnet is of a ring shape.

6. The rotary drive apparatus according to claim 1, wherein the rotor is disposed in the housing hole and has the second end face projecting out of the housing hole; and
    the motion limiting unit includes:
    a pressure bearing member extending radially outwardly from the second end face of the rotor; and
    a fluid passage for a fluid to flow therethrough for pressing the pressure bearing member toward the first end face of the rotor.

7. The rotary drive apparatus according to claim 4, further comprising a stopper configured to limit motion of the rotor toward the first end face thereof.

8. The rotary drive apparatus according to claim 1, further comprising a power transmitting unit configured to transmit rotary power of the rotor to the output shaft.

* * * * *